(12) United States Patent
Eckert et al.

(10) Patent No.: US 10,211,711 B2
(45) Date of Patent: Feb. 19, 2019

(54) BANDAGE TAPE WOUND PERMANENT MAGNET ROTOR OF AN ELECTRIC MACHINE

(71) Applicant: SIEMENS AKTIENGESELLSCHAFT, München (DE)

(72) Inventors: Rainer Eckert, Bad Neustadt/Herschfeld (DE); Andreas Kraus, Sondheim (DE)

(73) Assignee: Siemens Aktiengesellschaft, München (DE)

( * ) Notice: Subject to any disclaimer, the term of this patent is extended or adjusted under 35 U.S.C. 154(b) by 148 days.

(21) Appl. No.: 15/138,911

(22) Filed: Apr. 26, 2016

(65) Prior Publication Data

US 2016/0315514 A1   Oct. 27, 2016

(30) Foreign Application Priority Data

Apr. 27, 2015 (EP) .................................... 15165240

(51) Int. Cl.
*H02K 1/27* (2006.01)
*H02K 15/03* (2006.01)
*H02K 21/14* (2006.01)

(52) U.S. Cl.
CPC .......... *H02K 15/03* (2013.01); *H02K 1/2706* (2013.01); *H02K 1/278* (2013.01); *H02K 21/14* (2013.01)

(58) Field of Classification Search
CPC ....... H02K 1/2706; H02K 15/03; H02K 21/14
USPC .................................................. 310/156.31
See application file for complete search history.

(56) References Cited

U.S. PATENT DOCUMENTS

| | | | | |
|---|---|---|---|---|
| 4,868,970 | A * | 9/1989 | Schultz | H02K 1/278 264/272.2 |
| 6,995,489 | B2 * | 2/2006 | Ehrhart | H02K 1/148 310/156.27 |
| 7,202,582 | B2 | 4/2007 | Eckert et al. | |
| 7,692,356 | B2 | 4/2010 | Bott et al. | |
| 7,712,367 | B2 | 5/2010 | Eckert et al. | |
| 8,040,007 | B2 * | 10/2011 | Petrov | H02K 1/02 310/156.27 |
| 8,072,103 | B2 | 12/2011 | Eckert et al. | |
| 8,159,099 | B2 | 4/2012 | Duempert et al. | |

(Continued)

FOREIGN PATENT DOCUMENTS

| | | |
|---|---|---|
| CN | 204103632 U | 1/2015 |
| DE | 578799 C | 6/1933 |

(Continued)

*Primary Examiner* — John K Kim
(74) *Attorney, Agent, or Firm* — Henry M. Feiereisen LLC

(57) ABSTRACT

A rotor of an electric machine includes a plurality of permanent magnets arranged on an exterior of the rotor, and a bandage tape wound around the permanent magnets for fixing the permanent magnets in place. The bandage tape includes a first tape end, which is fastened to a surface of at least one permanent magnet, and a second tape end, which is an end of an outermost tape section of the bandage tape and is fastened to a tape section of the bandage tape disposed below the outermost tape section. The bandage tape is wound around the permanent magnets with a prestress such that in a region of each permanent magnet, at least one tape section of the bandage tape has a predeterminable minimum prestress.

13 Claims, 2 Drawing Sheets

(56) References Cited

U.S. PATENT DOCUMENTS

| | | | |
|---|---|---|---|
| 8,188,628 B2 | 5/2012 | Baehr et al. | |
| 8,247,938 B2 * | 8/2012 | Saban | H02K 1/02 |
| | | | 310/156.28 |
| 8,339,005 B2 * | 12/2012 | Rebollo Gomez | H02K 1/278 |
| | | | 310/156.18 |
| 8,698,367 B2 * | 4/2014 | Sortore | H02K 1/2753 |
| | | | 310/156.08 |
| 9,130,437 B1 | 9/2015 | Pulnikov | |
| 2003/0193255 A1 | 10/2003 | Ludwig | |
| 2008/0290761 A1 | 11/2008 | Eckert et al. | |
| 2010/0019602 A1 * | 1/2010 | Saban | H02K 1/02 |
| | | | 310/156.28 |
| 2016/0028282 A1 | 1/2016 | Geis et al. | |
| 2016/0111926 A1 * | 4/2016 | Arimatsu | H02K 1/2706 |
| | | | 310/156.31 |
| 2016/0315514 A1 * | 10/2016 | Eckert | H02K 15/03 |

FOREIGN PATENT DOCUMENTS

| | | | | |
|---|---|---|---|---|
| JP | 5980874 B2 * | 8/2016 | | H02K 1/2706 |
| WO | WO 8204505 A1 | 12/1982 | | |
| WO | WO2013/083186 A1 | 6/2013 | | |
| WO | WO 2013/193255 A1 | 6/2013 | | |

* cited by examiner

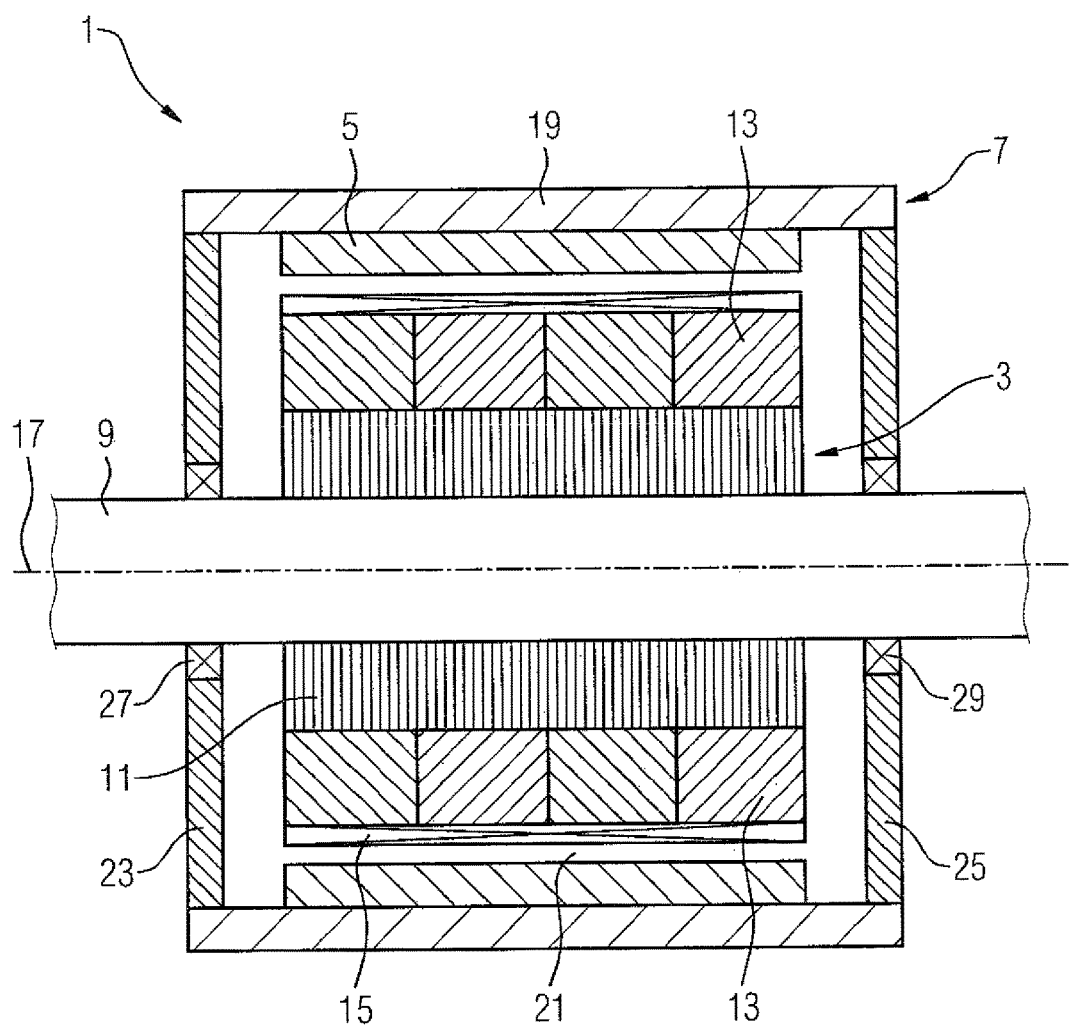

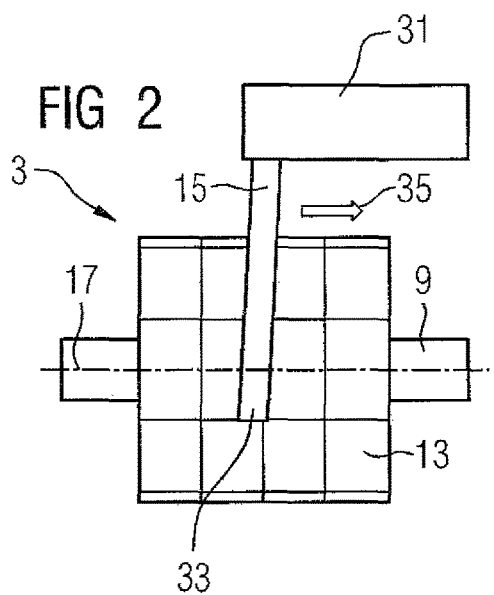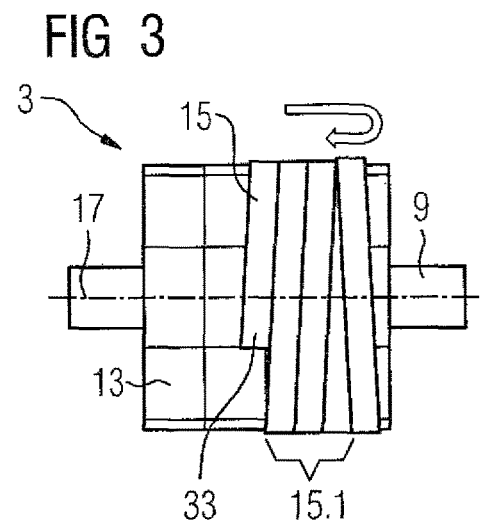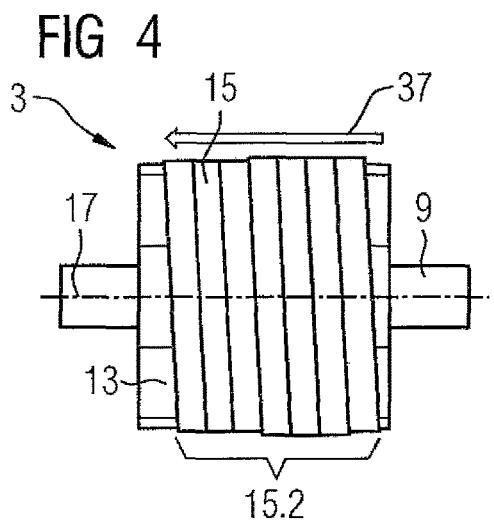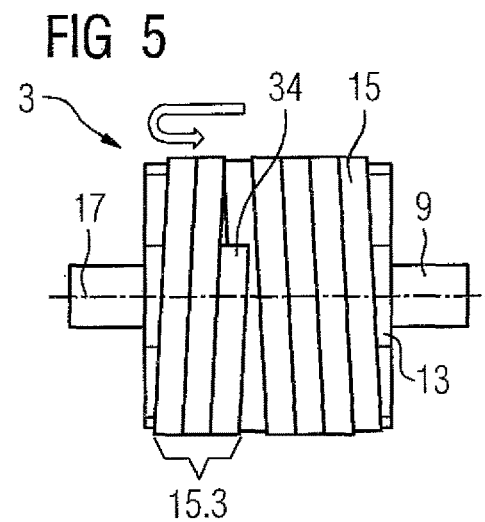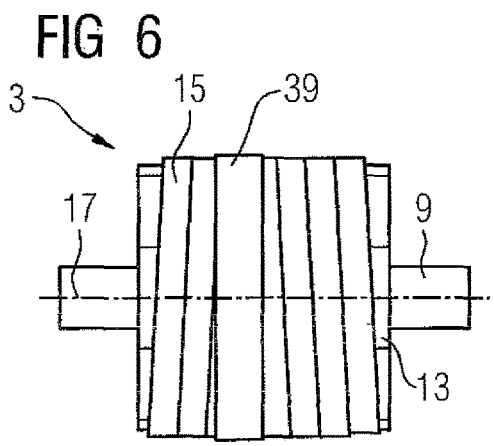

BANDAGE TAPE WOUND PERMANENT MAGNET ROTOR OF AN ELECTRIC MACHINE

CROSS-REFERENCES TO RELATED APPLICATIONS

This application claims the priority of European Patent Application, Serial No. 15165240.1, filed Apr. 27, 2015, pursuant to 35 U.S.C. 119(a)-(d), the disclosure of which is incorporated herein by reference in its entirety as if fully set forth herein.

BACKGROUND OF THE INVENTION

The present invention relates to a rotor of an electric machine.

The following discussion of related art is provided to assist the reader in understanding the advantages of the invention, and is not to be construed as an admission that this related art is prior art to this invention.

Rotors can find applications in servomotors and rapidly rotating motors. In rotors which have externally disposed permanent magnets, the permanent magnets are typically bandaged with bandage tapes made of tear-resistant materials so as to fix the permanent magnets in place. In order to accommodate the tape ends of a bandage tape, end discs, which rest each on an end region of a rotor laminated core of the rotor and to which the tape ends are fixed, are typically used in laminated rotors.

It would be desirable and advantageous to provide an improved rotor of an electric machine to obviate prior art shortcomings.

SUMMARY OF THE INVENTION

According to one aspect of the present invention, a rotor of an electric machine includes a plurality of permanent magnets arranged on an exterior of the rotor, and a bandage tape wound around the permanent magnets for fixing the permanent magnets in place, the bandage tape including a first tape end, which is fastened to a surface of at least one permanent magnet, and a second tape end, which is an end of an outermost tape section of the bandage tape and is fastened to a tape section of the bandage tape disposed below the outermost tape section, the bandage tape being wound around the permanent magnets with a prestress such that in a region of each permanent magnet, at least one tape section of the bandage tape has a predeterminable minimum prestress.

The present invention resolves prior art problems by fastening the tape ends of the bandage tape to a surface of at least one permanent magnet or to the bandage tape itself, and not fastened to an end disc of the rotor as is done conventionally in the art to date. As a result, it is possible to dispense with an end disc for fastening the tape ends, so that costs for manufacturing the rotor can be advantageously reduced, on one hand, and the rotor and the electric machine can be built in a more compact fashion, on the other hand, since by dispensing with an end disc, the longitudinal extent of the rotor can be reduced. Moreover, all permanent magnets can also be securely held on the exterior of the rotor by wrapping all the permanent magnets with a predetermined minimum prestress in each case of at least one tape section of the bandage tape.

According to another advantageous feature of the present invention, the first tape end can be fastened to the surface of the at least one permanent magnet by a bonded connection. Advantageously, the bonded connection may include at least one adhesive strip to fix the first tape end to the surface of at least one permanent magnet. A bonded connection, in particular by means of adhesive strips, advantageously allows for a simple and cost-effectively realizable fastening of the tape end to at least one permanent magnet.

According to another advantageous feature of the present invention, the first tape end can be arranged in a central region of a longitudinal extent of the rotor. A central fastening of the tape end in this manner is advantageous because it allows for a symmetrical attachment of the bandage tape.

According to another advantageous feature of the present invention, the bandage tape can have a plurality of adjoining tape sections, which are each wound spirally around the permanent magnets, each two adjoining ones of the tape sections being wound in opposite winding directions, with one of the two adjoining tape sections being wound at least partially around the other one of the two adjoining tape sections. Advantageously, the tape sections form at least two bandage layers disposed one above the other. Such a spiral-like, in particular at least two-layer, winding of the permanent magnets with the bandage tape in opposite winding directions advantageously enables a stable fastening of the permanent magnets, wherein a prestress of the bandage tape can, if necessary, be varied in different regions of the rotor.

According to another advantageous feature of the present invention, the second tape end can be welded to the tape section disposed below the outermost tape section. As a result, the second tape end can advantageously be fixed particularly reliably and permanently.

According to another aspect of the present invention, a method for producing a rotor of an electric machine includes fastening a first tape end of a bandage tape to a surface of at least one permanent magnet of a plurality of permanent magnets, winding a plurality of adjoining tape sections of the bandage tape consecutively spirally around the permanent magnets in such a manner that each two adjoining ones of the tape sections are wound in opposite winding directions and one of the two adjoining tape sections is wound at least partially around the other one of the two adjoining tape sections, and fastening a second tape end of an outermost tape section of the bandage tape to a tape section disposed below the outermost tape section, wherein the bandage tape is wound around the permanent magnets with a prestress such that in a region of each permanent magnet, at least one tape section of the bandage tape has a predeterminable minimum prestress.

A method according to the present invention enables the manufacture of a rotor with the advantages as described above. In particular, no end disc is needed to fix the tape ends.

According to another advantageous feature of the present invention, the second tape end can be joined to the tape section disposed below the outermost tape section by a welded connection, and the second tape end can be pressed on the tape section disposed below the outermost tape section by applying an adhesive film tape. The adhesive film can be removed from the bandage tape after the welded connection between the outermost tape section and the tape section disposed below the outermost tape section has hardened.

Welding the second tape end allows for a reliable and permanent fixing of the second tape end. By pressing the second tape end onto the tape section disposed below the outermost tape section by using an adhesive film tape, this advantageously prevents part of the second tape end from projecting from the rotor and as a result possibly causing the rotor to grind upon a surrounding stator of the electric machine. By removing the adhesive film tape after hardening of the welded connection, the weight of the rotor is advantageously reduced and an asymmetry of the rotor caused by the adhesive film tape is avoided.

According to still another aspect of the present invention, an electric machine includes a rotor as described above. The electric machine may be embodied as a synchronous motor, in particular as a servomotor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic sectional view of an electric machine;

FIG. 2 is a schematic side view of a rotor of the electric machine having a plurality of permanent magnets arranged on an exterior of the rotor, around which a bandage tape is wound, depicting a first phase of attaching the bandage tape;

FIG. 3 is a schematic side view of the rotor, depicting a second phase of attaching the bandage tape;

FIG. 4 is a schematic side view of the rotor, depicting a third phase of attaching the bandage tape;

FIG. 5 is a schematic side view of the rotor, depicting a fourth phase of attaching the bandage tape; and FIG. 6 is a schematic side view of the rotor, depicting a fifth phase of attaching the bandage tape.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic sectional view of an electric machine, generally designated by reference numeral 1. The electric machine 1 includes a rotor 3, a stator 5 and a machine housing 7. The electric machine 1 is embodied for instance as a servomotor, which is a synchronous motor.

The rotor 3 has a rotor shaft 9, a rotor laminated core 11 arranged around a section of the rotor shaft 9, a number of permanent magnets 13 arranged on an exterior of the rotor laminated core 11 and a bandage tape 15 wound around the permanent magnets 13 for fixing the permanent magnets 13 to the rotor laminated core 11. A longitudinal axis 17 of the rotor shaft 9 defines an axial direction. The permanent magnets 13 are arranged on the rotor laminated core 11 such that they form a number of magnet rows of permanent magnets 13 arranged axially one behind the other, wherein the rows run adjacent and parallel to one another on the periphery of the rotor laminated core 11. Optionally the rotor laminated core 11 (not shown) has openings for receiving an impact kit. The bandage tape 15 is produced, for instance, from a carbon fiber-reinforced plastic (CFRP) or a glass fiber-reinforced plastic (FRP), which optionally has an additional resin matrix.

The machine housing 7 comprises a substantially cylindrical housing casing 19, which surrounds the rotor laminated core 11, the permanent magnets 13 and the bandage tape 15 of the rotor 3 and is arranged at a distance from the rotor 3 by an air gap 21 on its inner surface of the stator 5. Furthermore, the machine housing 7 has two substantially disc-shaped bearing shields 23, 25, which are arranged on ends of the housing casing 19 which are disposed axially opposite to one another and each support a bearing 27, 29, in which the rotor shaft 9 is mounted.

FIGS. 2 to 6 illustrate various phases of the method in accordance with the present invention for wrapping the permanent magnets 13 with the bandage tape 15, when the rotor 3 is manufactured. FIGS. 2 to 6 show side views of the rotor 3 in various phases of attachment of the bandage tape 15 by means of a bandaging device 31 (only shown schematically).

FIG. 2 shows the start of the attachment of the bandage tape 15, in which a first tape end 33 of the bandage tape 15 is fastened in a central region of the axial extent of the rotor 3 to a surface of at least one permanent magnet 13. Here the first tape end 33 is fastened to the surface of the at least one permanent magnet 13 by means of a bonded connection, for instance by means of at least one adhesive strip.

According to the display in FIG. 3, a first tape section 15.1 of the bandage tape 15 is then wound spirally around permanent magnets 13 from the first tape end 33 by means of the bandaging device 31 in a first winding direction 35 toward the vicinity of the first axial end of the magnet rows.

The winding direction of the bandage tape 15 is then reversed, and according to the display in FIG. 4, a second tape section 15.2 of the bandage tape 15 adjoining the first tape section 15.1 is wound spirally around permanent magnets 13 and the first tape section 15.1 in a second winding direction 37 opposite to the first winding direction 35 toward the vicinity of the second axial ends of the magnet rows.

The winding direction of the bandage tape 15 is then reversed again according to the display in FIG. 5 and a third tape section 15.3 of the bandage tape 15 adjoining the second tape section 15.2 is wound spirally around permanent magnets 13 and a part of the second tape section 15.2 in the first winding direction 35 up to approximately the center of the magnet rows so that the tape sections 15.1 to 15.3 form two bandage layers disposed one above the other.

A second tape end 34 of the bandage tape 15 is subsequently welded at the end of the third tape section 15.3, which is an outermost tape section of the bandage tape 15, to the second tape section 15.2 and according to FIG. 6 is pressed on the second tape section 15.2 by means of an adhesive film tape 39. The adhesive film tape 39 is then removed from the bandage tape 15, since the welded connection of the third tape section 15.3 is hardened with the second tape section 15.2.

With the attachment of the bandage tape 15 shown in FIGS. 2 to 6, the bandage tape 15 is wound around the permanent magnets 13 with a prestress, wherein during the winding the prestress is preferably increased from an initial value to a final value and is then held at the final value so that in the region of each permanent magnet 13 at least one tape section 15.1 to 15.3 has a predeterminable minimum prestress.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rotor of an electric machine, comprising:
   a plurality of permanent magnets arranged on an exterior of the rotor; and
   a bandage tape made of a carbon fiber-reinforced plastic (CFRP) or a glass fiber-reinforced plastic (FRP) and wound around the permanent magnets for fixing the permanent magnets in place, said bandage tape including a first tape end and a second tape end, with the first tape end being fastened to a surface of at least one permanent magnet, said bandage tape being spirally wound around the permanent magnets with a prestress adequate to hold the permanent magnets in place on the rotor, wherein the spirally wound bandage tape comprises a first tape section that extends over at least one half of a longitudinal extent of the rotor and wound in a first winding direction, a second tape section that extends over the axial extent of the rotor and wound in a second winding direction opposite to the first winding direction, and a third tape section wound in the first winding direction and including the second tape end, wherein the second tape end is welded to the tape section disposed below the third tape section and at least two tape sections having opposite winding directions are arranged on top of one another along the longitudinal extent of the rotor.

2. The rotor of claim 1, wherein the first tape end is fastened to the surface of the at least one permanent magnet by a bonded connection.

3. The rotor of claim 2, wherein the bonded connection comprises at least one adhesive strip to fix the first tape end to the surface of at least one permanent magnet.

4. The rotor of claim 1, wherein the first tape end is fastened to the surface of the at least one permanent magnet in a central region of the longitudinal extent of the rotor.

5. A method for producing a rotor as set forth in claim 1, said method comprising:
   fastening a first tape end of a bandage tape made of a carbon fiber-reinforced plastic (CFRP) or a glass fiber-reinforced plastic (FRP) to a surface of at least one permanent magnet of a plurality of permanent magnets;
   winding a first tape section of the bandage tape that extends over at least one half of a longitudinal extent of the rotor spirally around the permanent magnets in a first winding direction, winding a second tape section that extends over the axial extent of the rotor and is wound in a second winding direction opposite to the first winding direction over the first tape section, and winding a third tape section in the first winding direction over the second tape section that does not cover the first tape section; and
   welding a second tape end of an outermost tape section of the bandage tape to the second tape section,
   wherein the bandage tape is wound around the permanent magnets with a prestress adequate to hold the permanent magnets in place on the rotor.

6. The method of claim 5, further comprising joining the second tape end to the tape section disposed below the outermost tape section by a welded connection, and pressing the second tape end on the tape section disposed below the outermost tape section by applying an adhesive film tape.

7. The method of claim 6, further comprising removing the adhesive film tape from the bandage tape after the welded connection between the outermost tape section and the tape section disposed below the outermost tape section has hardened.

8. An electric machine, comprising a rotor which includes a plurality of permanent magnets arranged on an exterior of the rotor; and a bandage tape made of a carbon fiber-reinforced plastic (CFRP) or a glass fiber-reinforced plastic (FRP) and wound around the permanent magnets for fixing the permanent magnets in place, said bandage tape including a first tape end and a second tape end, with the first tape end being fastened to a surface of at least one permanent magnet, said bandage tape being spirally wound around the permanent magnets with a prestress adequate to hold the permanent magnets in place on the rotor, wherein the spirally wound bandage tape comprises a first tape section that extends over at least one half of a longitudinal extent of the rotor and wound in a first winding direction, a second tape section that extends over the axial extent of the rotor and wound in a second winding direction opposite to the first winding direction, and a third tape section wound in the first winding direction and including the second tape end, wherein the second tape end is welded to the tape section disposed below the third tape section and at least two tape sections having opposite winding directions are arranged on top of one another along the longitudinal extent of the rotor.

9. The electric machine of claim 8, wherein the first tape end is fastened to the surface of the at least one permanent magnet by a bonded connection.

10. The electric machine of claim 9, wherein the bonded connection comprises at least one adhesive strip to fix the first tape end to the surface of at least one permanent magnet.

11. The electric machine of claim 8, wherein the first tape end is fastened to the surface of the at least one permanent magnet in a central region of the longitudinal extent of the rotor.

12. The electric machine of claim 8, constructed in the form of a synchronous machine.

13. The electric machine of claim 8, constructed in the form of a servomotor.

* * * * *